(12) United States Patent
Rhodes

(10) Patent No.: US 7,342,325 B2
(45) Date of Patent: *Mar. 11, 2008

(54) UNIVERSAL FLEET ELECTRICAL SYSTEM

(76) Inventor: Michael Rhodes, 604 SE. 2nd Ave., Grand Rapids, MN (US) 55744

( * ) Notice: Subject to any disclaimer, the term of this patent is extended or adjusted under 35 U.S.C. 154(b) by 368 days.

This patent is subject to a terminal disclaimer.

(21) Appl. No.: 10/662,356

(22) Filed: Sep. 16, 2003

(65) Prior Publication Data

US 2004/0061446 A1   Apr. 1, 2004

Related U.S. Application Data

(63) Continuation-in-part of application No. 10/287,491, filed on Nov. 5, 2002, now Pat. No. 7,132,761, which is a continuation-in-part of application No. 09/985,680, filed on Nov. 5, 2001, now Pat. No. 6,600,236.

(51) Int. Cl.
H02G 3/16   (2006.01)
H02G 3/18   (2006.01)

(52) U.S. Cl. .................... 307/10.6; 307/10.1
(58) Field of Classification Search ............... 307/10.6
See application file for complete search history.

(56) References Cited

U.S. PATENT DOCUMENTS

| | | | | |
|---|---|---|---|---|
| 4,122,357 A * | 10/1978 | Sumida | ...................... | 307/10.1 |
| 4,403,155 A | 9/1983 | Aoki et al. | ............... | 307/10 R |
| 4,689,718 A | 8/1987 | Maue et al. | ................ | 361/360 |
| 4,850,884 A | 7/1989 | Sawai et al. | ................... | 439/76 |
| 4,864,154 A * | 9/1989 | Copeland et al. | .......... | 307/10.7 |
| 4,956,561 A | 9/1990 | Tamer | ....................... | 307/10.1 |
| 5,296,840 A * | 3/1994 | Gieffers | ..................... | 340/474 |
| 5,703,411 A * | 12/1997 | Bella et al. | ................. | 307/10.1 |
| 5,825,098 A * | 10/1998 | Darby et al. | ............... | 307/10.1 |
| 5,856,711 A * | 1/1999 | Kato et al. | .................. | 307/10.6 |
| 5,949,148 A * | 9/1999 | Wagner | ..................... | 307/10.1 |
| 5,957,985 A * | 9/1999 | Wong et al. | .................. | 701/33 |
| 5,973,409 A | 10/1999 | Niebecker et al. | ......... | 307/10.1 |
| 5,990,570 A | 11/1999 | Yoshida et al. | ............. | 307/10.1 |
| 6,087,777 A * | 7/2000 | Long | ........................... | 315/82 |
| 6,150,734 A | 11/2000 | Niebecker et al. | ......... | 307/10.1 |
| 6,161,278 A * | 12/2000 | Easter et al. | .................. | 29/749 |
| 6,307,279 B1 | 10/2001 | Yoshida et al. | ............. | 307/10.1 |
| 6,311,637 B1* | 11/2001 | Moss | ......................... | 116/200 |
| 6,411,874 B2 | 6/2002 | Morgan et al. | ............... | 701/36 |
| 6,600,236 B2* | 7/2003 | Rhodes | ...................... | 307/10.1 |
| 6,674,182 B2* | 1/2004 | Maynard et al. | ........... | 307/10.8 |
| 2003/0090153 A1* | 5/2003 | Rhodes | ...................... | 307/10.1 |

* cited by examiner

Primary Examiner—Robert L. Deberadinis
Assistant Examiner—Hal I Kaplan
(74) Attorney, Agent, or Firm—Richard C. Litman

(57) ABSTRACT

A universal fleet electrical system includes a central power distribution panel, which includes a fuse panel and a lighting selector junction box, together with a universal wiring harness. A dash mounted console is provided for operator control of accessory devices. The console may include a keyed switch interconnected with a security power control relay for enabling a user to connect and disconnect power to the universal wiring harness. Power may be connected and disconnected to the universal wiring harness through the use of a master switch with a circuit breaker. The lighting selector junction box permits various lighting accessories to be connected to different light level circuits. The universal wiring harness may include a plurality of plug and play connectors to facilitate rapid attachment/removal of external accessories. A serial interface may interconnect the wiring harness with the fuse panel.

13 Claims, 15 Drawing Sheets

UNIVERSAL FLEET ELECTRICAL SYSTEM

CROSS-REFERENCES TO RELATED APPLICATIONS

This is a continuation-in-part of my prior application Ser. No. 10/287,491, filed Nov. 5, 2002, now U.S. Pat. No. 7,132,761, which is a continuation-in-part of application Ser. No. 09/985,680, filed Nov. 5, 2001, now U.S. Pat. No. 6,600,236, which are incorporated herein by reference.

BACKGROUND OF THE INVENTION

1. Field of the Invention

The present invention relates to motor vehicle electrical systems, and particularly to a universal fleet electrical system for fleets of emergency vehicles, such as police vehicles.

2. Description of the Related Art

Law enforcement agencies typically have large fleets of motor vehicles which require a wide variety of aftermarket accessories, including, but not limited to, radios, light bars, arrow sticks, flashers for high beams, grill lights, brake and backup lights, strobe lights, dash lights, rear deck lighting, mobile dispatch terminals, video cameras, and computers. Original equipment manufacture police packages offer base packages which are very expensive and which do not begin to provide the capability of handling all accessory needs. State agencies and local government entities have tight budgetary constraints which require that accessory systems be put up for bid to local vendors. Unfortunately, wiring systems vary from vendor to vendor, and often accessories must be hard wired by tapping into the vehicle's existing wiring system. As accessories accumulate, the vehicle's accessory wiring system becomes very complex with no unifying schematic. Consequently, when an accessory fails, it becomes very difficult and time consuming to track down the fault through the vehicle's wiring system.

Various inventions have sought to simplify vehicle wiring systems to make electrical systems more economical and to reduce the cost of servicing vehicle electrical systems. The related art is represented by the following references of interest.

U.S. Pat. No. 4,403,155, issued on Sep. 6, 1983 to Hideo Aoki et al., describes a wiring system which eliminates external jumper wires by housing a switch box and fuse box in a connector box with buss bars which branch to terminals and split terminals leaving the connector box. The Aoki et al. patent does not suggest a universal electrical fleet system according to the claimed invention.

U.S. Pat. No. 4,689,718, issued on Aug. 25, 1987 to H. Winston Maue et al., describes a junction box with circuit boards inside, and a top cover having sockets which receive standard wire harnesses, customized buss bars selected by vehicle options, and any additional components required by the accessory circuits. The Maue et al. patent does not suggest a universal electrical fleet system according to the claimed invention.

U.S. Pat. No. 4,850,884, issued on Jul. 25, 1989 to Mamoru Sawai et al., describes a junction box to which a controller and a wire harness attach, the junction box having buss bars inside. The Sawai et al. patent does not suggest a universal electrical fleet system according to the claimed invention.

U.S. Pat. No. 4,864,154, issued on Sep. 5, 1989 to Hugh D. Copeland et al., describes a device for shutting down auxiliary devices in a police car which are not connected to or controlled by the ignition switch, e.g., radios, public address, etc., so that the battery does not run down, the device comprising a timer circuit between the battery and the auxiliary device. The Copeland et al. patents do not suggest a universal electrical fleet system according to the claimed invention.

U.S. Pat. No. 4,956,561, issued on Sep. 11, 1990 to A. B. Tamer, describes a smart power connector for carrying multiplexed data signals between a central control module and peripheral control modules. The Tamer patent does not suggest a universal electrical fleet system according to the claimed invention.

U.S. Pat. No. 5,296,840, issued on Mar. 22, 1994 to W. J. Gieffers, describes a programmable emergency signaling system for a vehicle which includes a control head mounted in the dash area of the vehicle, a programmable control unit in the trunk of the vehicle, and a serial communications cable linking the control head to the control unit. The control unit is programmed by a keypad which may be integral with the control head, or which may be on a laptop computer that can be connected to the control head. Relays for switching the lights, sirens, or other accessories are connected to the control unit. The system is an add on, however, and does not disclose a universal wiring system and harness adapted for connection to the control head and control unit. The Gieffers patent does not suggest a universal electrical fleet system according to the claimed invention.

U.S. Pat. No. 5,949,148, issued on Sep. 7, 1999 to W. F. Wagner, describes a power connection box with fused circuits and relays to control various devices on a police car or other emergency vehicle. The box is mounted under the dash, receives one wire from the positive terminal of the battery and a second wire from the ignition switch. The box provides some output terminals which are always hot, some output terminals which are hot only so long as the ignition switch is on, and some output terminals which are hot with the ignition on but with a delay to keep them hot for a predetermined time when the ignition is turned off, and fused circuit pass throughs for connecting a light controller to the light bar. The device uses a tamer integrated circuit and a flip-flop. The Wagner patent does not suggest a universal electrical fleet system according to the claimed invention.

U.S. Pat. Nos. 5,973,409 and 6,150,734, issued on Oct. 26, 1999 and Nov. 21, 2000, respectively, to Niels Neibecker et al., describes a system having a case including a signal distribution board and a power distribution board which are connected by a first card with fuses and a second card with relays. The Neibecker et al. patents do not suggest a universal electrical fleet system according to the claimed invention.

U.S. Pat. Nos. 5,990,570 and 6,307,279, issued on Nov. 23, 1999 and Oct. 23, 2001, respectively to Tatsuya Yoshida et al., describe a solid state power distribution device for eliminating fuses and reducing wiring requirements. The Yoshida et al. patents do not suggest a universal electrical fleet system according to the claimed invention.

U.S. Pat. No. 6,411,874, issued on Jun. 25, 2002 to Joseph Morgan et al., describes a control system for a police car or other emergency vehicle having a user interface, preferably with a "touch screen" keypad, disposed in the passenger compartment which is connected to a central controller in the trunk of the vehicle by a data bus. The system reduces clutter in the passenger compartment by reduction of multiple switch controls in the passenger compartment. The Morgan patent does not describe such a control system integrated into a universal harness controlling all vehicle electrical functions. The Morgan et al. patent does not suggest a universal electrical fleet system according to the claimed invention.

None of the above inventions and patents, taken either singularly or in combination, is seen to describe the instant invention as claimed. Thus a universal fleet electrical system solving the aforementioned problems is desired.

SUMMARY OF THE INVENTION

The universal fleet electrical system is an integrated system for supplying electrical power to aftermarket accessories, particularly to police vehicles and other emergency vehicles. The system includes a central power distribution panel, which includes a fuse panel and a lighting selector junction box, together with a universal wiring harness. A variety of custom wiring harnesses may also be used in the universal fleet electrical system. A dash mounted console is provided for operator control of the various accessory devices. The console may include a keyed switch interconnected with a security power control relay adapted for enabling a user to connect and disconnect power to the universal wiring harness. The universal fleet electrical system may also be configured for enabling a user to connect and disconnect power to the universal wiring harness through the use of a master switch with a circuit breaker adapted for connection to a fleet vehicle's battery. The lighting selector junction box permits various lighting accessories to be connected to different light level circuits through push connectors, so that a plurality of lighting devices may be controlled by a single switch. A serial interface may interconnect the wiring harness with the fuse panel.

The universal wiring harness includes wiring harnesses and connectors connected to various spare switch-controlled circuits as additional accessories are added to the vehicle. The connectors may be configured as plug and play connectors to facilitate rapid attachment/removal of external accessories. Troubleshooting and maintenance are facilitated by color coding and labeling of the wires in the harness. Connection of remote accessories, such as a light bar mounted on the vehicle roof, is facilitated through a novel weatherproof boot connector, rather than hard wiring the light bar to the harness. The wiring harness features various convenience features, such as industrial braiding to reduce harness cable diameter under carpeting and molding.

The universal fleet electrical system may also be designed for systems which use a multipurpose controller on the console connected to relays in the trunk, or a programmable control head connected to a control unit in the trunk, for reducing the number of switch heads and switch wiring in the console area. In this case power leads for the controller are incorporated into the wiring harness, as well as a serial communications cable extending between the console and the trunk.

Accordingly, it is a principal aspect of the invention to eliminate the time and expense involved in tapping additional aftermarket accessories into an existing vehicle electrical system by providing a universal fleet electrical system for distributing electrical power to aftermarket accessories in police and emergency vehicles.

It is another aspect of the invention to reduce the time an expense of troubleshooting failed aftermarket accessories in fleet vehicles through a universal fleet electrical system having standardized cable runs identified by color coding and labeling.

It is a further aspect of the invention to provide a universal fleet electrical system having a wiring harness with spare circuits having wiring connectors located at various locations within the vehicle for quick addition of aftermarket accessories to the vehicle.

Still another aspect of the invention is to provide a universal fleet electrical system having an improved harness using industrial braiding and connectors may be configured as plug and play connectors to facilitate rapid attachment/removal of external accessories.

It is an aspect of the invention to provide improved elements and arrangements thereof in a universal fleet electrical system for the purposes described which is inexpensive, dependable and fully effective in accomplishing its intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
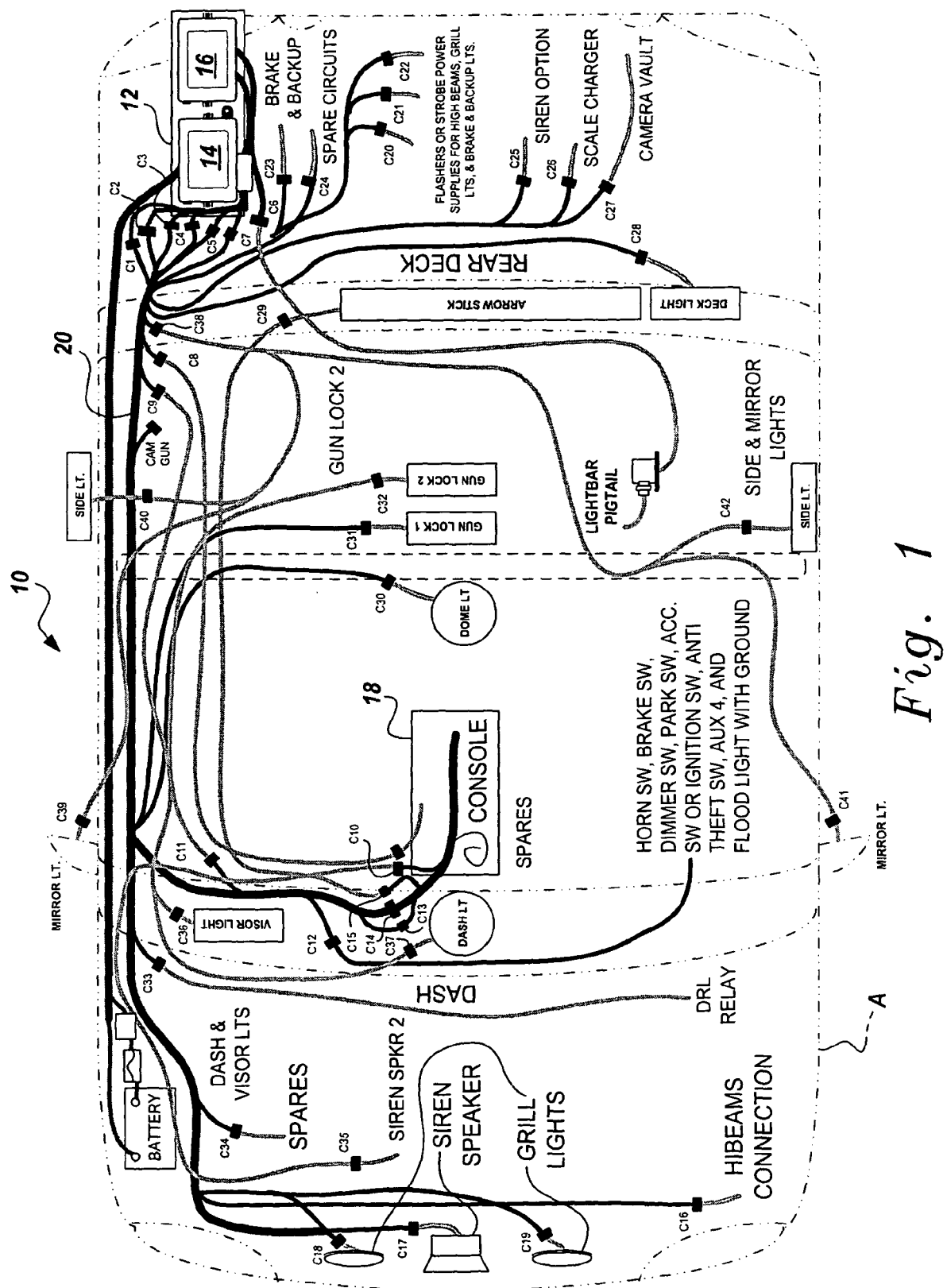
FIG. 1 is a schematic view of a universal fleet electrical system as seen from the top of a police vehicle showing disposition of the components of the system according to the present invention.

The present invention is a universal fleet electrical system. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments. Furthermore, while the present invention is described with respect to a police vehicle, the principles of the present invention may also be applicable to ambulances, fire chief vehicles, paramedic vehicles, sheriff's vehicles, plow vehicles, snow plow vehicles, and the like.

FIG. 1 is a schematic diagram showing the preferred layout of universal fleet electrical system components in a police vehicle A. The universal fleet electrical system 10 includes a standardized power distribution panel 12, which encompasses a fuse panel 14 and a lighting selector junction box 16. The power distribution panel 12 is preferably disposed in the trunk of the vehicle A. The fleet electrical system 10 also includes a console panel 18 disposed in or under the dash of the vehicle A, the console panel 18 having a plurality of user operated switches for controlling various electrical circuits in the system 10. Finally, the universal fleet electrical system 10 includes a universal wiring harness 20 having a plurality of connectors numbered C1-C45 disposed at predetermined locations in the vehicle for connecting aftermarket accessories to the electrical system 10. The wiring is color coded and stamped with indicia for circuit identification in order to facilitate maintenance and service of the universal fleet electrical system.

The wiring harness 20 may include standard and/or optional connectors designated C1-C42. For example, standard connectors may include connectors C1-C16, and optional connectors may include connectors C17-C42. The position and function of the illustrated connectors are as indicated in the following table.

| Wiring Harness Connectors | | |
|---|---|---|
| C1 | Trunk | Main distribution |
| C2 | Trunk | Main distribution |
| C3 | Trunk | Main distribution |
| C4 | Trunk | Main distribution |
| C5 | Trunk | Main distribution |
| C6 | Trunk | Main distribution |
| C7 | Trunk | Main distribution |
| C8 | Trunk | Main distribution |
| C9 | Trunk | Main distribution |
| C10 | Dash | Console panel |
| C11 | Dash | Console panel |
| C12 | Deck | Horn ring bypass |
| C13 | Dash | Console panel |
| C14 | Dash | Console panel |
| C15 | Dash | Console panel |
| C16 | Front | Headlights |
| C17 | Front | Siren speaker |
| C18 | Front | Grill lights |
| C19 | Front | Grill lights |
| C20 | Trunk | Flasher for hi-beams |
| C21 | Trunk | Flasher for grill lights |
| C22 | Trunk | Brake & back-up flasher |
| C23 | Trunk | Brake and back-up light |
| C24 | Trunk | Spare circuits |
| C25 | Trunk | Siren option |
| C26 | Trunk | Scale charger |
| C27 | Trunk | Camera control |
| C28 | Deck | Deck light |
| C29 | Deck | Arrow stick |
| C30 | Dash | Dash light |
| C31 | Interior | Gun lock |
| C32 | Interior | Gun lock |
| C33 | Dash | DRL relay |
| C34 | Front | Spare circuits |
| C35 | Dash | Siren speaker |
| C36 | Front | Visor light |
| C37 | Dash | Dash light |
| C38 | Trunk | Main distribution |
| C39 | Side | Right mirror light |
| C40 | Side | Right side light |
| C41 | Side | Left mirror light |
| C42 | Side | Left side light |

The wiring harness 20 includes several spare circuits throughout the harness run, which may be accessed at the front of the vehicle, at the dash or console panel 18, in the trunk, etc.

The wiring harness 20 includes several features which are improved over conventional accessory harnesses. For example, conventional wiring harnesses are protected by encasing the harness in a hard, corrugated plastic tube which is split longitudinally. In the wiring harness 20 of the present invention the cables are braided loosely in order to present a flat profile and reduce harness diameter under carpeting and molding. In conventional wiring harnesses, the harness for the light bar is hard wired and extends through the roof, so that it is necessary to remove the roof upholstery and pull the wiring through the roof for replacement or servicing. The wiring harness 20 of the present invention includes a special 90° weatherproof lightbar pigtail connector for attachment to the light bar, so that if the light bar needs to be removed for service, the pigtail can be removed and a plug can be placed over the pigtail connector. The pigtail connector uses a through-the-roof base going through the roof of the vehicle and a wiring harness having a 90° weatherproof boot which removably attaches to the pigtail connector and which connects to a light bar accessory mounted on the roof of the police vehicle A.

Figure 2A:
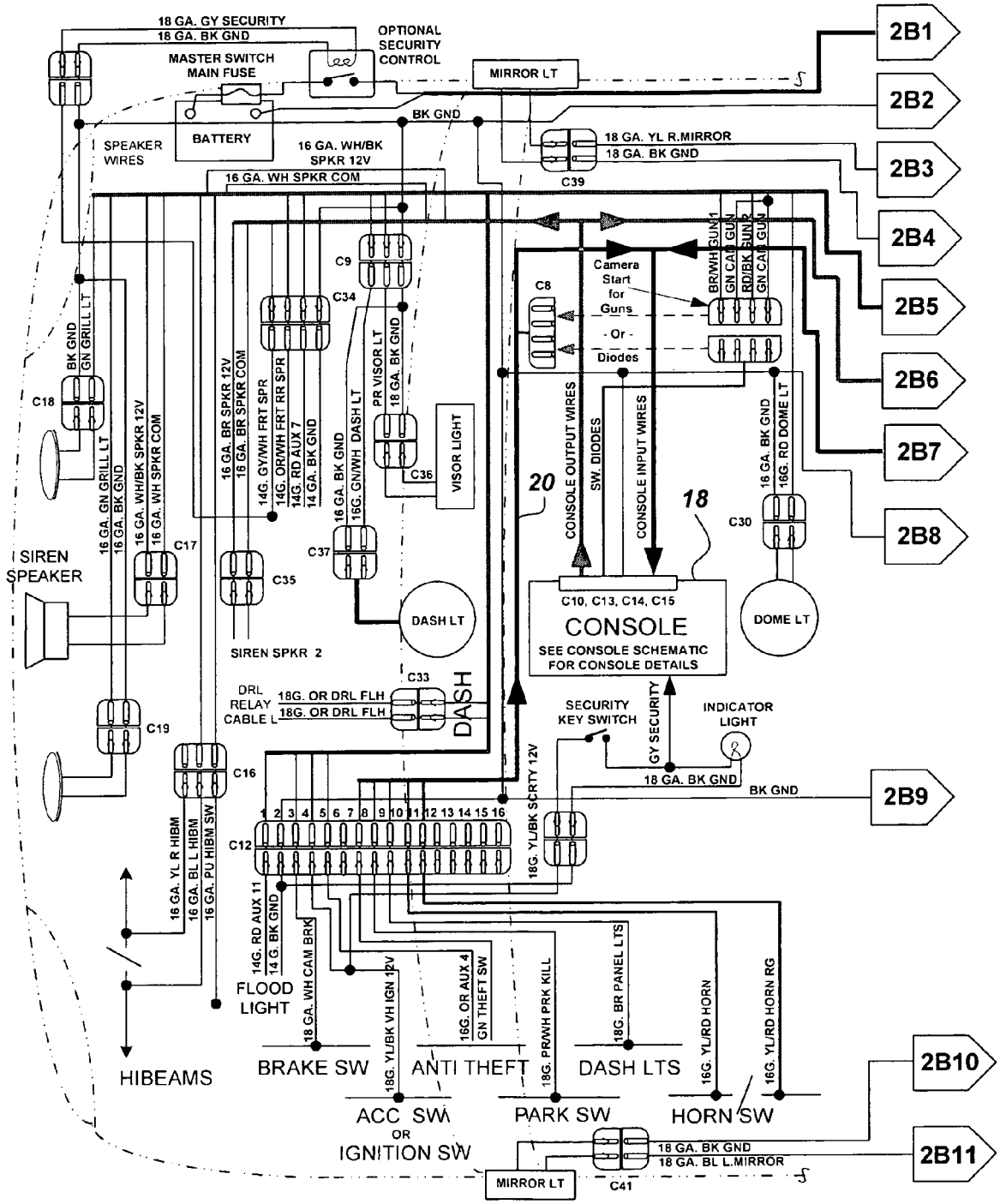
FIGS. 2A and 2B are a schematic drawing of the universal fleet electrical system shown in FIG. 1.
Figure 2B:
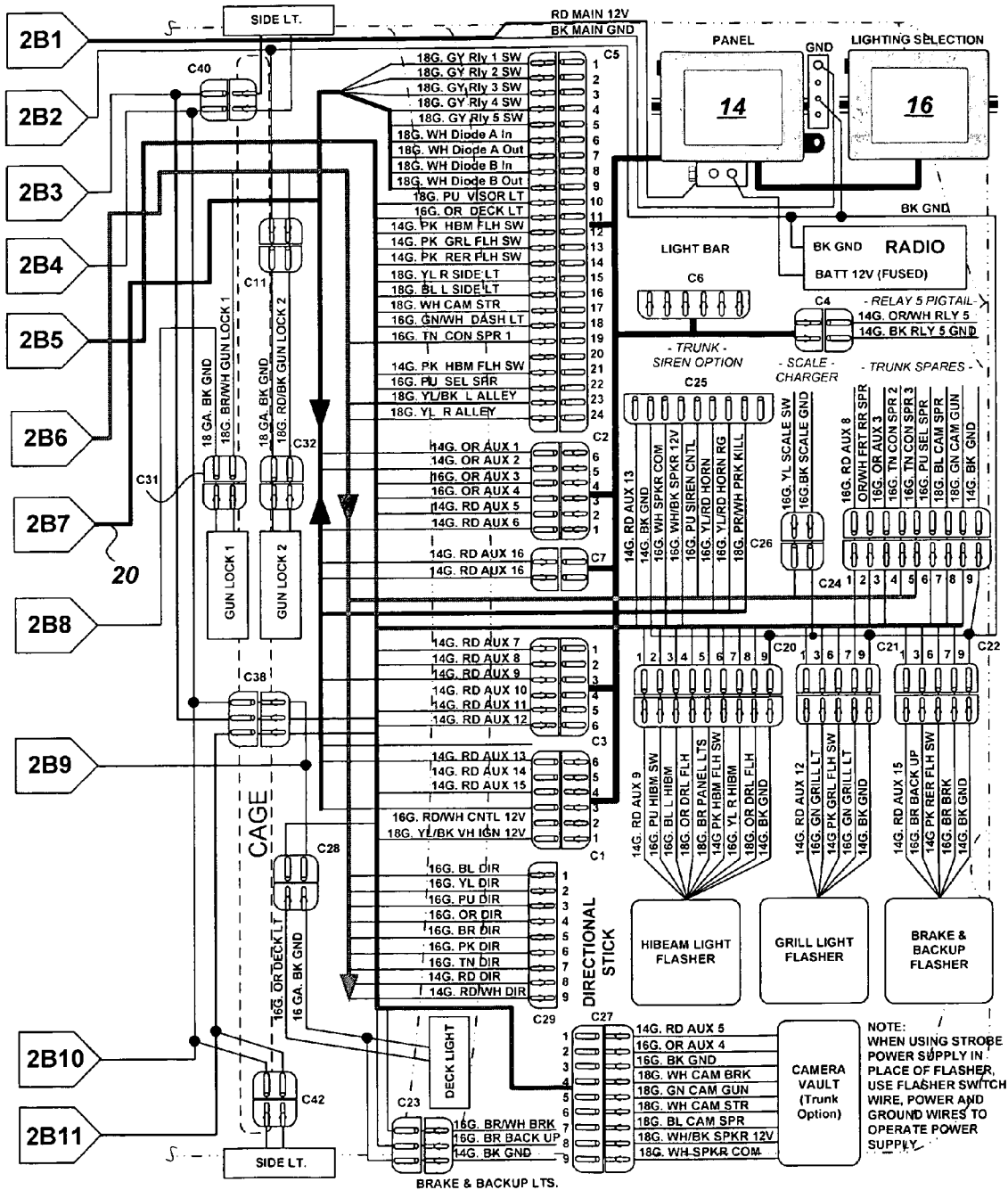

FIGS. 2A and 2B illustrate a schematic wiring diagram showing how the various components of the universal fleet electrical system 10 (fuse panel 14, lighting selection junction box 16, and console panel 18) are connected by universal wiring harness 20 to the various accessories in the police vehicle A. Power is distributed from the main electrical panel 14 to accessories interconnected with the electrical wiring system 10 via connectors C1, C2, C3, C5, and C7. FIGS. 2A and 2B include additional connections to the police vehicle A primary electrical system. Referring to connector C12, the wiring harness 20 is connected to the vehicle's brake switch, ACC or ignition switch, anti-theft switch (gun lock switch), park switch, and dash lights by tapping into the vehicle's existing wiring system using a conventional crimp type connector to tap into the wiring. For example, the tap into the ignition or ACC switch is connected via connectors C12, C1 and intermediate harness wiring to the ignition relay solenoid coil, so that when the ignition switch is turned to the "ON" position, the solenoid is energized, closing the relay's switch contacts and connecting auxiliary circuits via connector C7 to the twelve volt buss bar through the ignition relay fuse. The harness 20 connects to the horn switch by splicing into the existing primary electrical system. Likewise, referring to connector C16, the hi-beams are connected to the wiring harness 20 by splicing into the vehicles electrical system.

FIGS. 2A and 2B also show additional accessories (hi-beam flasher, grill flasher, brake and back-up flasher, camera control, etc.) and the optional runs of harness 20 and cable connectors provided for connecting the accessories, together with the color coding scheme for the wiring. The universal wiring harness 20 relies both upon color coding and stamped indicia on the wiring to permit rapid identification of the cabling, thereby reducing maintenance, servicing and troubleshooting time. While optional portions of the wiring harness may be customized or made to order as desired, preferably all of the connectors C1-C45 of the universal wiring harness 20 are configured in the form of plug and play connectors to facilitate rapid attachment/removal of external accessories. As used herein, such plug and play connectors refer to connectors configured to enable a user to interconnect an external accessory and readily activate the interconnected external accessory with minimal effort and without typical time consuming and/or tedious wiring interconnection operations. For example, siren speakers, dash lights, visor lights, side/mirror lights, gun locks, dome lights, deck lights, flashers, strobe power supplies, sirens, cameras, or the like, provided with plug and play connectors on the equipment side will attach to the universal wiring harness 20.

Figure 3A:
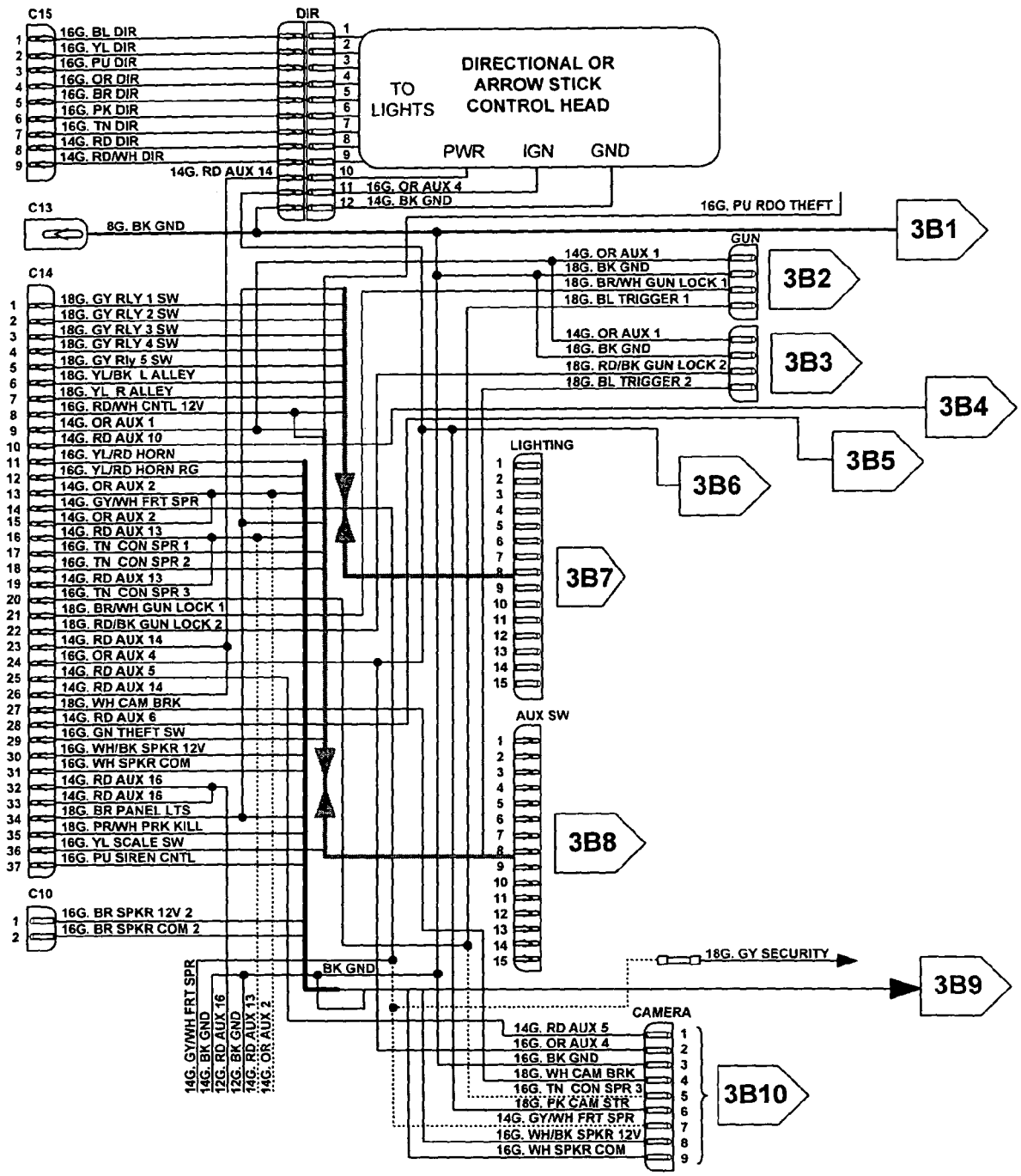
FIGS. 3A and 3B are a schematic drawing of a console panel in a universal fleet electrical system according to the present invention.
Figure 3B:
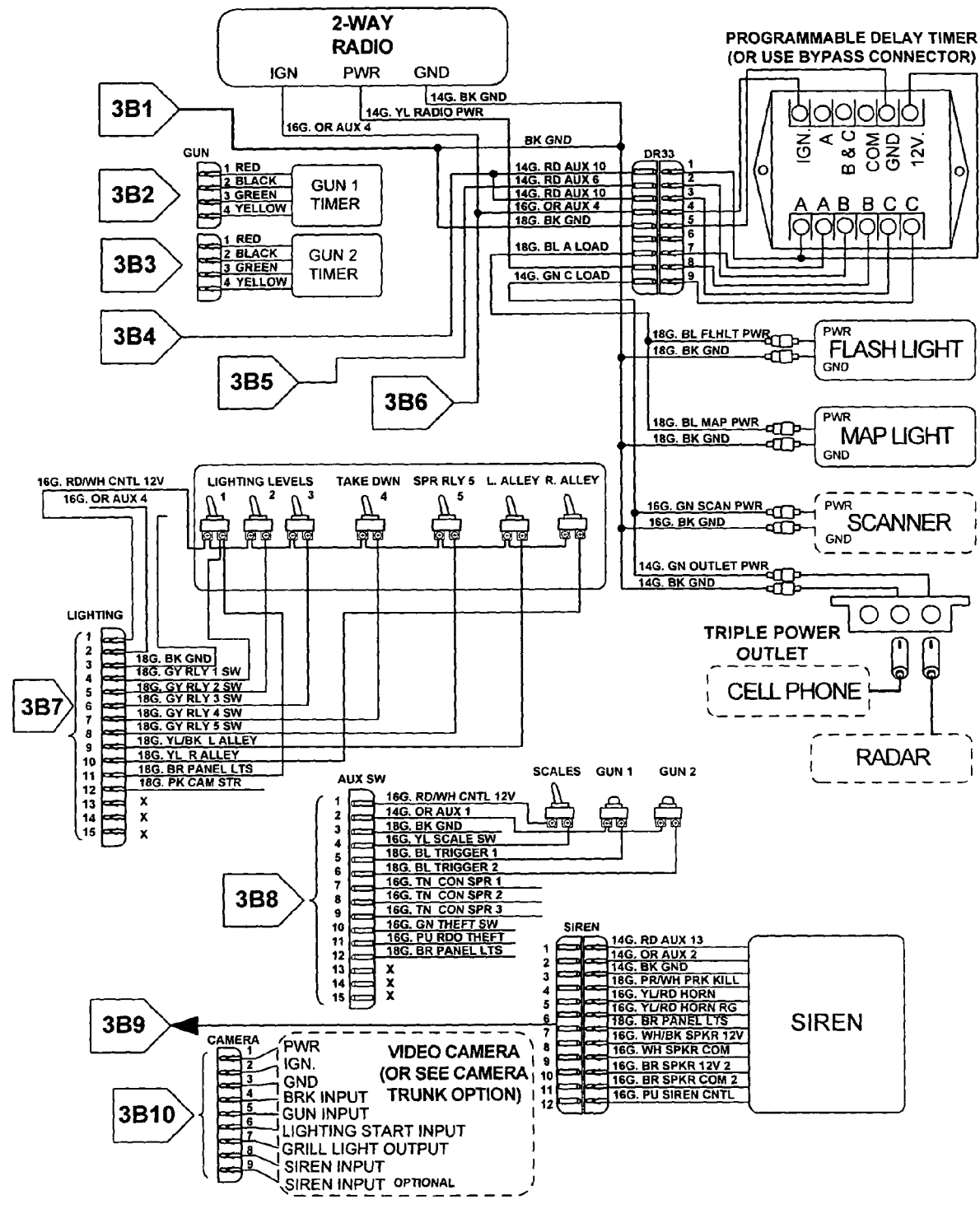

FIGS. 3A and 3B illustrate a schematic diagram of the console panel 18 according to the present invention. A plurality of user operable control switches are disposed on the console panel 18. The console panel 18 contains at least three lighting level switches, designated level 1, level 2, and level 3. The switches are shown as normally open toggle switches in the drawings, although the type of switch (toggle, slide, push button, etc.) is not critical. One contact of each switch is connected to the control circuit on the fuse panel 14 via connectors C1, C13, and intermediate wiring, and is therefore always hot. The other contact of the lighting level 1 switch is connected to one side of the solenoid coil of relay 1, the other side of the coil being connected to ground, so that when level 1 switch is turned to the "on" position, the switch contacts of relay 1 close, thereby applying power to any accessories connected to relay 1 at the terminal block. In similar fashion, the second contact of lighting level 2 switch is connected to the solenoid coil of relay 2 and the second contact of lighting level 3 switch is connected to the solenoid coil of relay 3 to control power to the accessories connected to those relays at the terminal block.

In some circumstances it may be desired to connect the same lighting accessory to more than one lighting level switch. For example, it may be desired to have the lighting level 1 switch control turning all lighting accessories on and off, while the hi-beams is one of the accessories controlled by the lighting level 2 switch and the brake and backup flashers are controlled by the lighting level 3 switch. In this case the anodes of two diodes on the fuse panel 14 are connected to the second contact of the lighting level 1 switch via connector C5, C14, and intermediate wiring. The cathode of one diode is connected to the second contact of the lighting level 2 switch, and the cathode of another diode is connected to the second contact of the lighting level 3 switch. In this manner the diode prevents feedback from the hi-beams circuit when the lighting level switches are turned on simultaneously, and the other diode prevents feedback from the brake and backup light circuit when the lighting level switches are turned on simultaneously.

The console panel includes a TAKE DOWN switch for controlling those light accessories which shine a blinding light into a motorist's vehicle when the motorist is pulled over by a police vehicle. One contact of the TAKE DOWN switch is connected to the control circuit and is always hot, while the second contact is connected to the solenoid coil of relay 4 to control the lighting accessories connected to the relay 4 at the terminal block. The trunk switch has one contact connected to the control circuit and is always hot, while the second contact is connected to the solenoid coil of relay 5 to control any accessories which may be connected to the relay 5 in the trunk at the pigtail connector.

The console panel 18 may have a scales switch which is supplied with power via the Aux 2 fuse and delivers power at C14 to a scale charger which some police vehicles are equipped with for weighing trucks and other vehicle loads. The console panel 18 may have a scan switch (not shown) which is supplied with power via the Aux 2 fuse and delivers power to a scanner located near the dash. The spare switch, left alley switch and right alley switch are shown being supplied with power at one contact through Aux fuse 4. The other contact of the left and right alley switches are connected to the light bar via connector C14 and intermediate wiring. The other contact of the spare switch is connected to spare wires in the lighting selection junction box. The console panel 18 may contain push button switches for gun locks which secure guns, such as rifles or shotguns, within the police vehicle A.

The console panel 18 switches are generally wired through the harness terminating at connector C14. Connector C14 also delivers power to a number of other accessory devices which have their own built-in switches for applying and removing power. C14 connects these devices to the various auxiliary circuits on fuse panel 14. The accessory devices may include a siren control, a Mobile Dispatch Terminal, a portable radio, a flashlight, a map light, a directional or arrow stick control head (a control head which outputs control signals to the arrow stick through wiring harness connectors C15 and C29) and a two way radio control head. Power may also be applied to a triple power outlet, which permits various accessories such as a cellphone or computer inverter to be connected through cigarette lighter plugs and the like. Several of these accessories may be supplied with power through a programmable timer delay. Programmable timer delays are conventional devices well known in the art for shutting off power to an accessory a predetermined time after the ignition switch is turned to the off position in order to prevent battery drain. An example of a programmable timer delay suitable for use with the present invention is a model DR-33 programmable timer made by Minstar Technologies, Inc. of Grand Rapids, Minn. The accessory devices may be connected to the ground buss through the harness wires terminating at connector C13.

Figure 4:
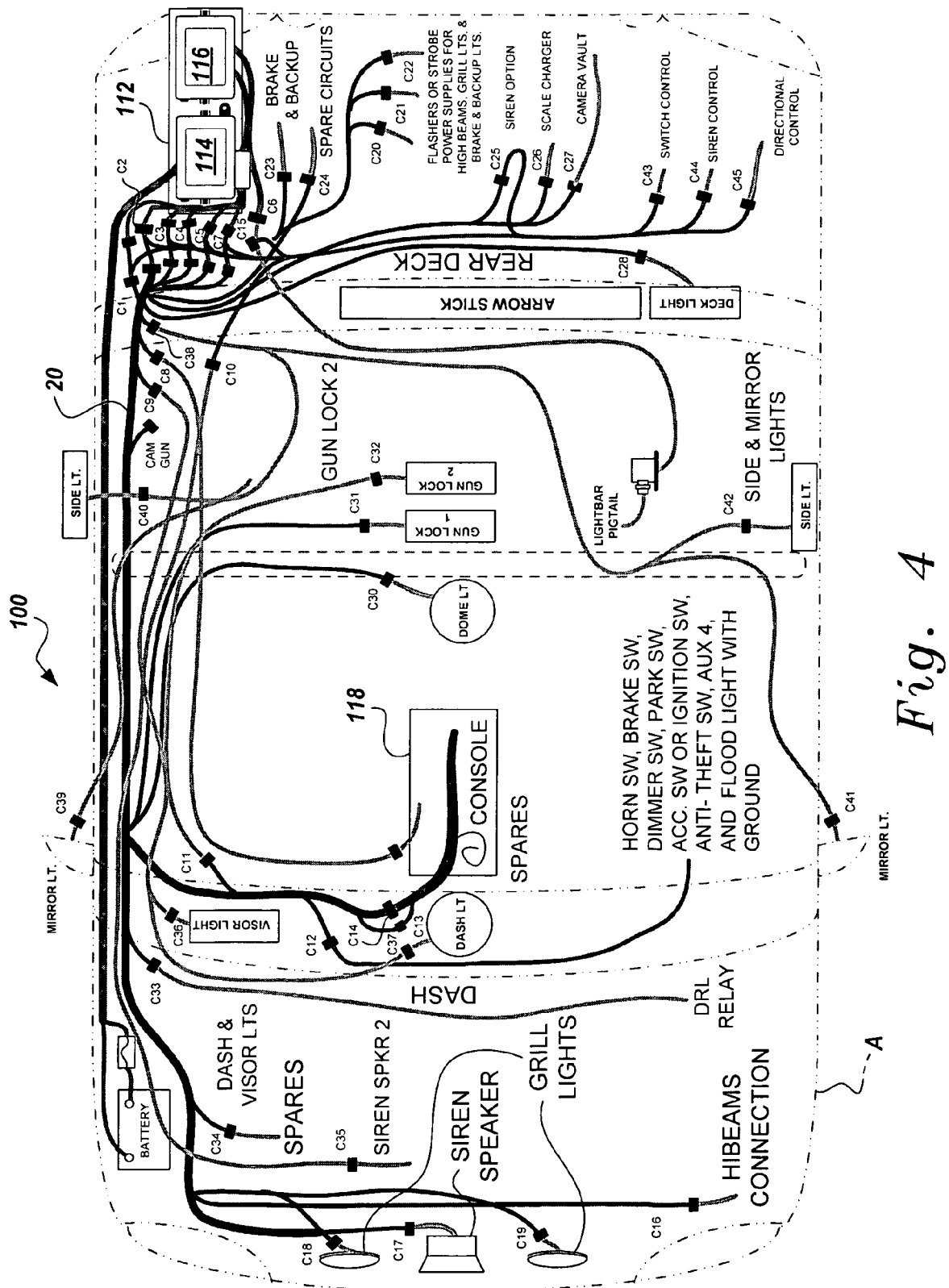
FIG. 4 is a schematic view of a universal fleet electrical system adapted for use with a serial controller as seen from the top of a police vehicle showing disposition of the components of the fleet electrical system according to the present invention.

FIG. 4 illustrates a schematic diagram of a police vehicle equipped with a universal fleet electrical system 100, similar to universal fleet electrical system 10 described above, and adapted for use with a microprocessor-based serial controller. The modification involves the use of a serial interface to interconnect the wiring harness 20 with the power distribution panel 112. The use of serial controllers is known in the art for reducing the number of control switches on the console with a corresponding reduction in the volume of switch wiring. Serial controllers provide a consolidated switch panel which considerably facilitates the use of emergency accessory equipment. Serial controllers are available in a variety of configurations. One configuration is exemplified by the CENCOM type (CenCom is a trademark of Whelen Engineering Company, Inc. of Chester, Conn.) made by Whelen Engineering Company, Inc., and by the disclosure of U.S. Pat. No. 5,296,840, assigned to Federal Signal Corporation. In this style of controller, a control head in the console area is linked to a control unit in the trunk by a serial communications cable, which may be a twisted pair of wires. The control unit is connected to relays which switch accessories, such as lighting, sirens, etc., in response to operation of button, slide or rotary switches on the control head. The control head may be programmable by software to configure the control head switches. A similar serial controller which may be used with the present invention is a model F/S SS2000, made by Federal Signal Corporation. In a second configuration, as exemplified by the Smart Link System, also made by Whelen Engineering Company, Inc., a model MPC01 multi-purpose controller is installed on the console and is connected to several relays in the trunk by a serial communications cable. The relays may include a siren amplifier control, a current switch control for controlling lights, a directional light arrow control relay, etc.

Currently such serial controllers are added to an existing wiring harness or fleet electrical system as an after market add-on. The present invention enables users to utilize a single universal wiring harness that may be used for conventional wired equipment, and that may be used with serial controlled systems via the use of the serial interface.

The universal fleet electrical system 100 simplifies such installation. The modified universal fleet electrical system 100 includes a variety of components in a police vehicle A. As before, the system 100 includes a standardized power distribution panel 112, again encompassing a fuse panel 114 and a lighting selector junction box 116. The power distribution panel 112 is preferably disposed in the trunk of the vehicle.

Figure 5A:
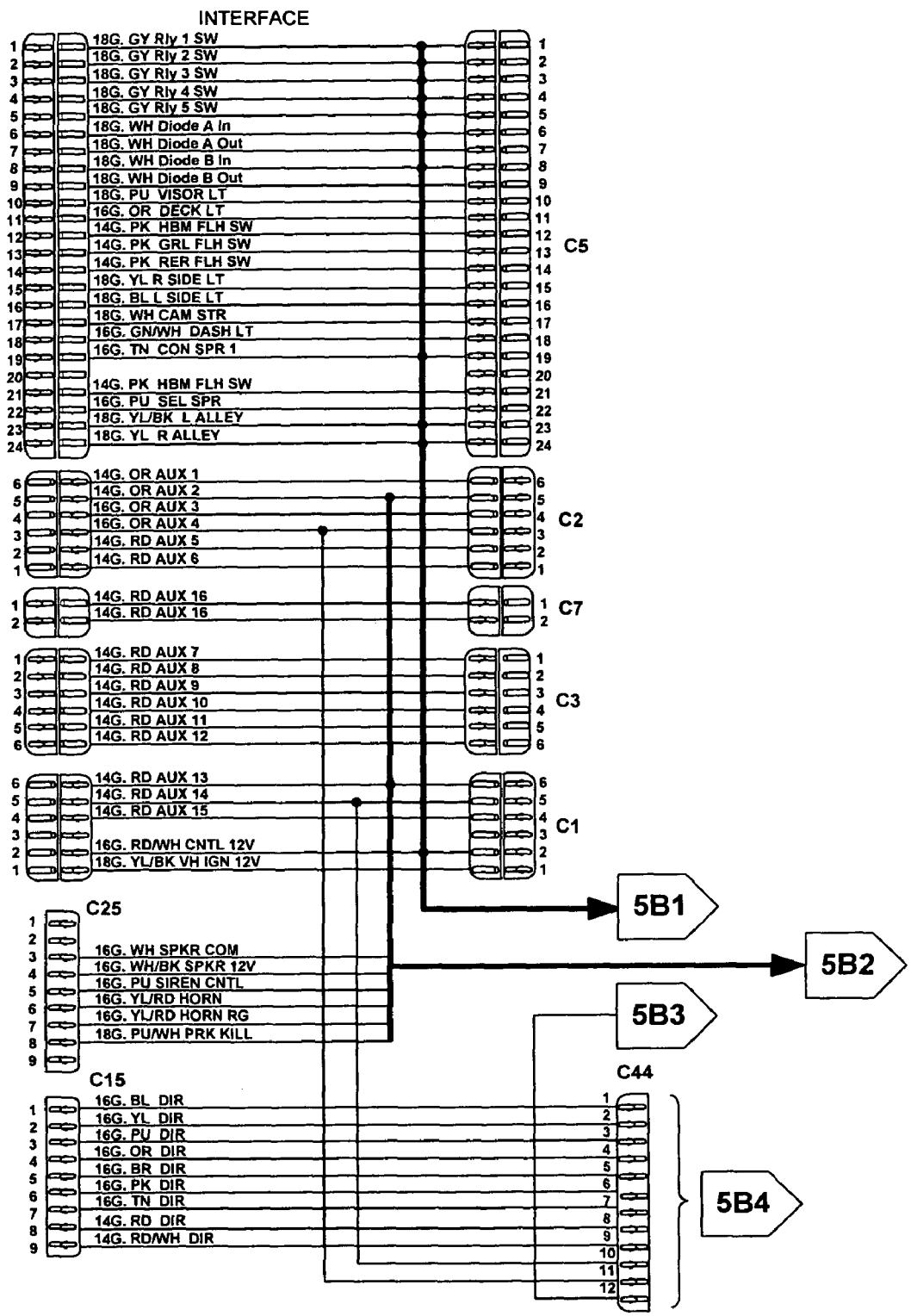
FIGS. 5A and 5B are a schematic diagram of a serial interface for use in the universal fleet electrical system shown in FIG. 4.
Figure 5B:
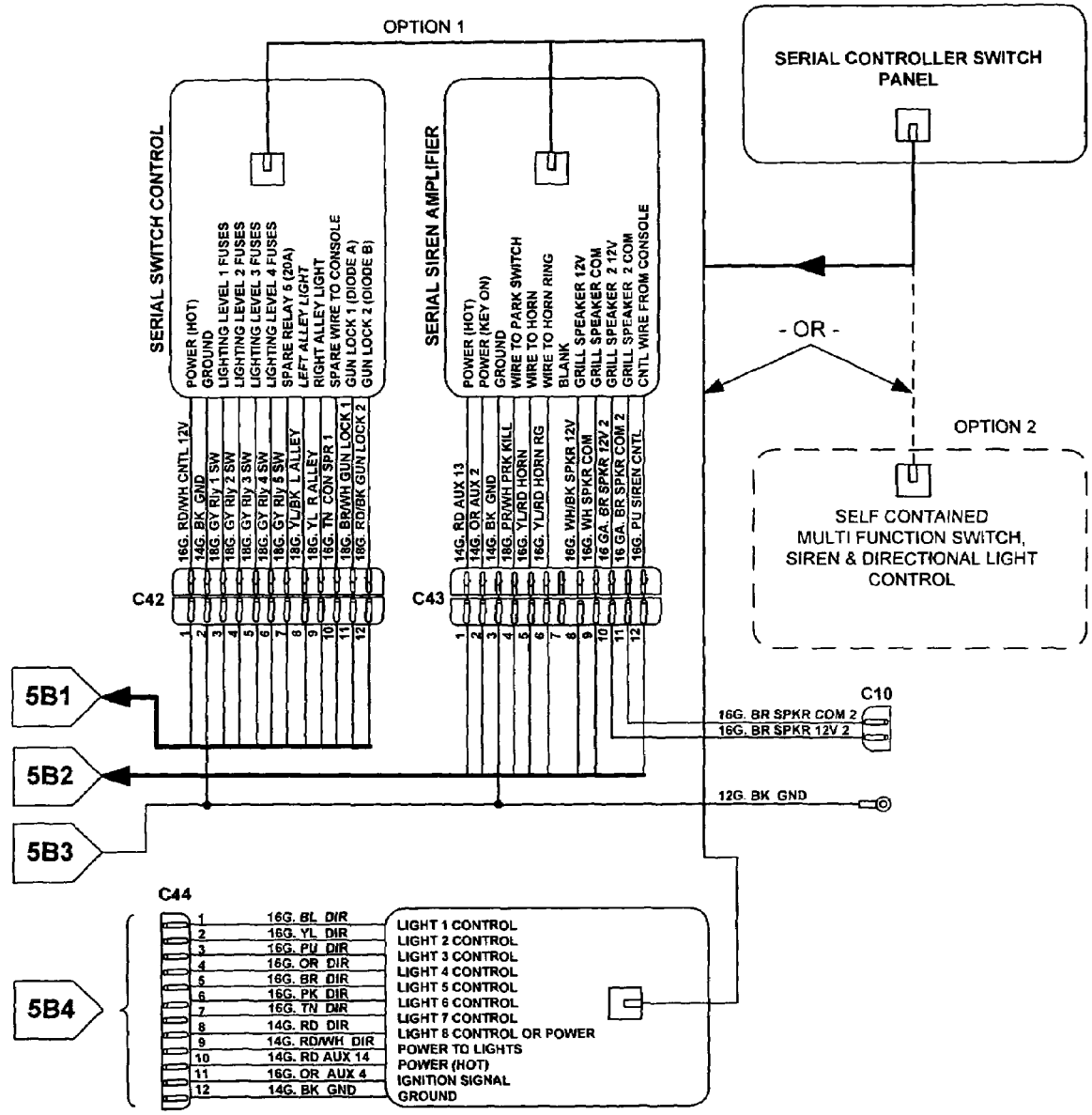
Figure 6A:
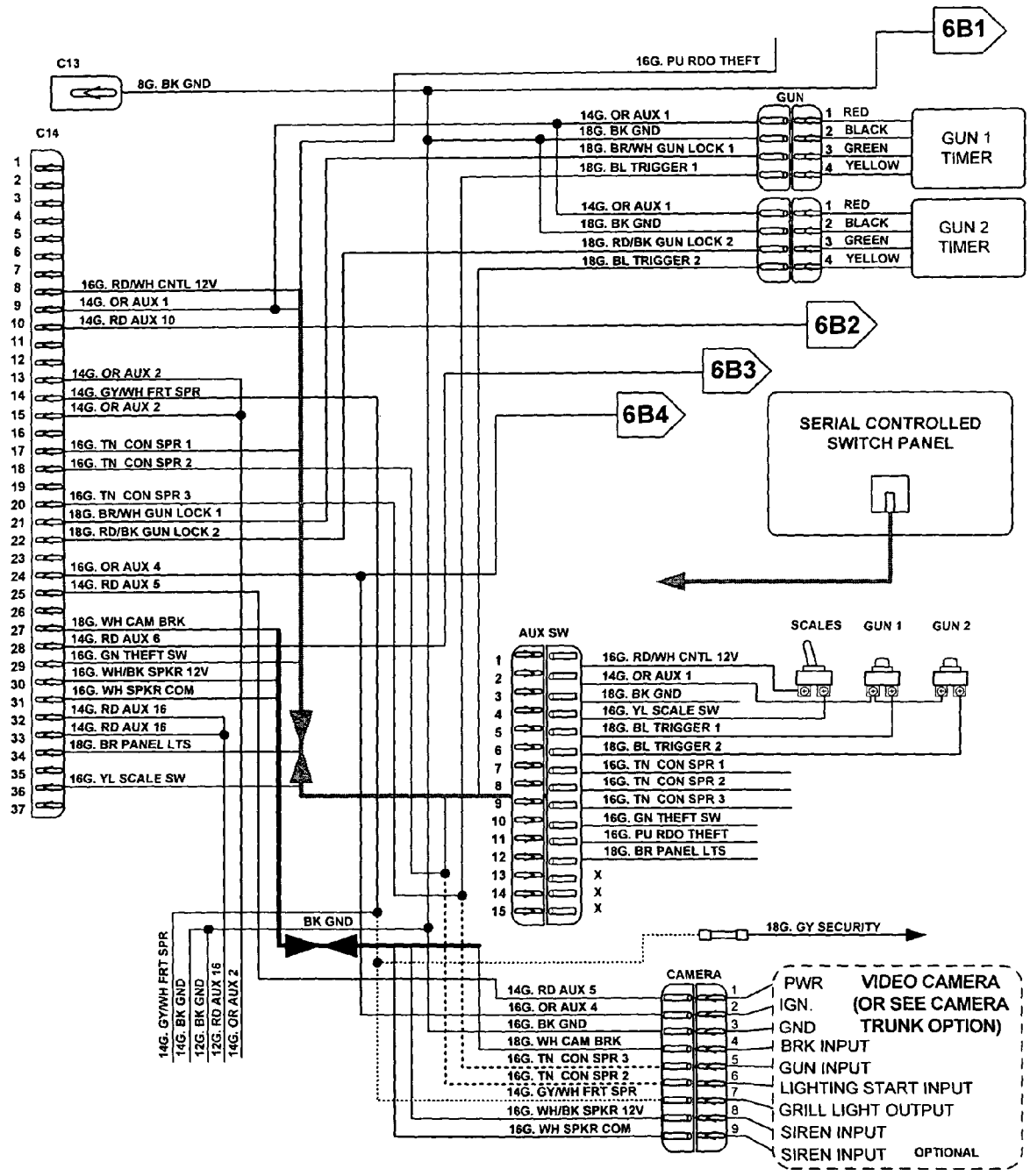
FIGS. 6A and 6B are a schematic drawing of console wiring for use in the universal fleet electrical system shown in FIG. 4.
Figure 6B:
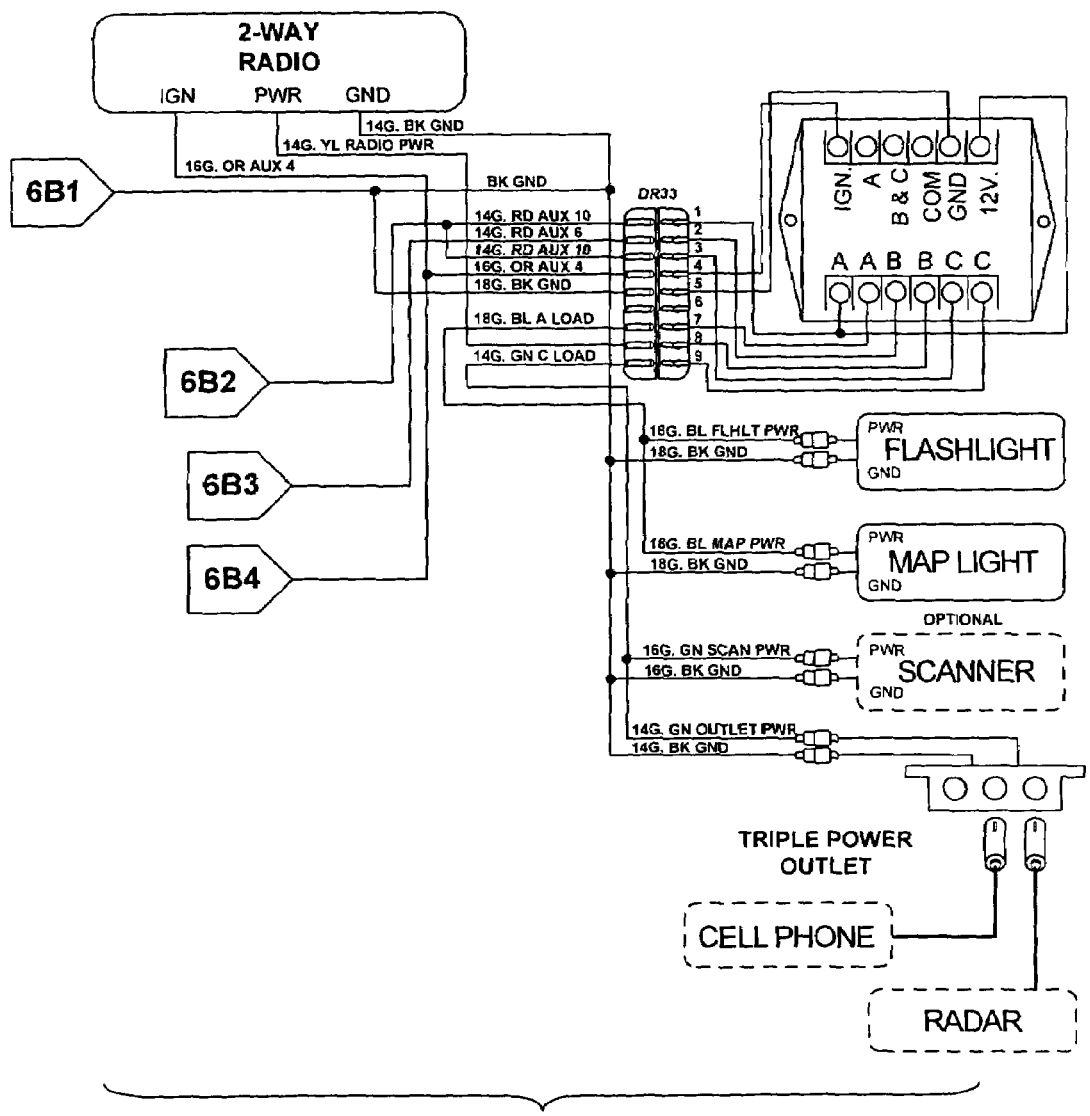

The wiring harness includes a serial interface which interconnects the main distribution panel 112 with the wiring harness. The serial interface incorporates a serial communications cable which may be connected to either a control unit in the case of a programmable system of the CENCOM type, or to a serial siren control amplifier, serial current switch control, serial directional control, etc. in the case of a multi-function serial controller of the MPC01 type. FIGS. 5A and 5B illustrate a schematic drawing of the serial interface. FIGS. 6A and 6B again illustrate the console wire circuitry configured for serial control.

Figure 7A:
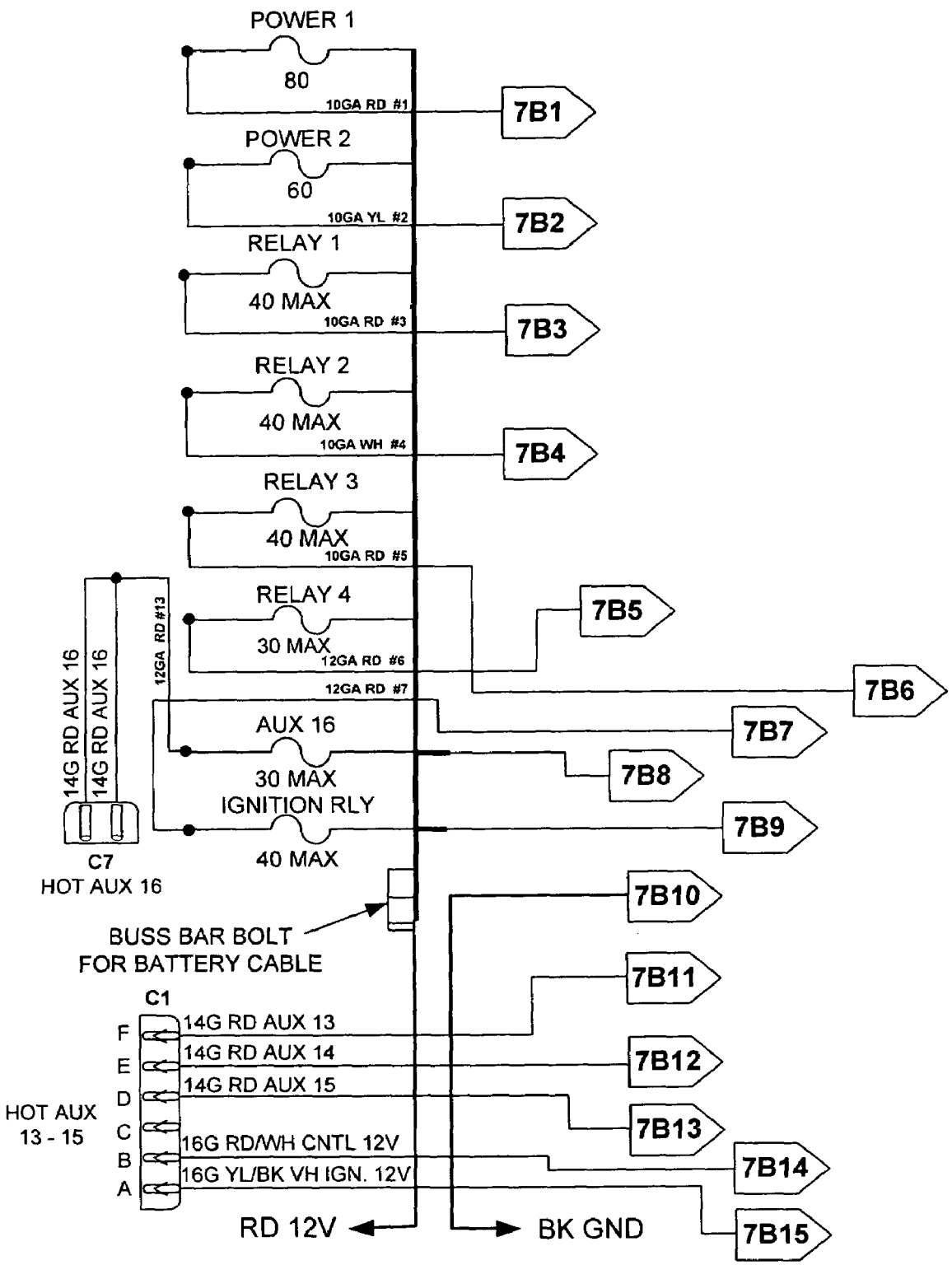
FIGS. 7A, 7B, and 7C are a schematic drawing of a fuse panel for a universal fleet electrical system according to the present invention.
Figure 7B:
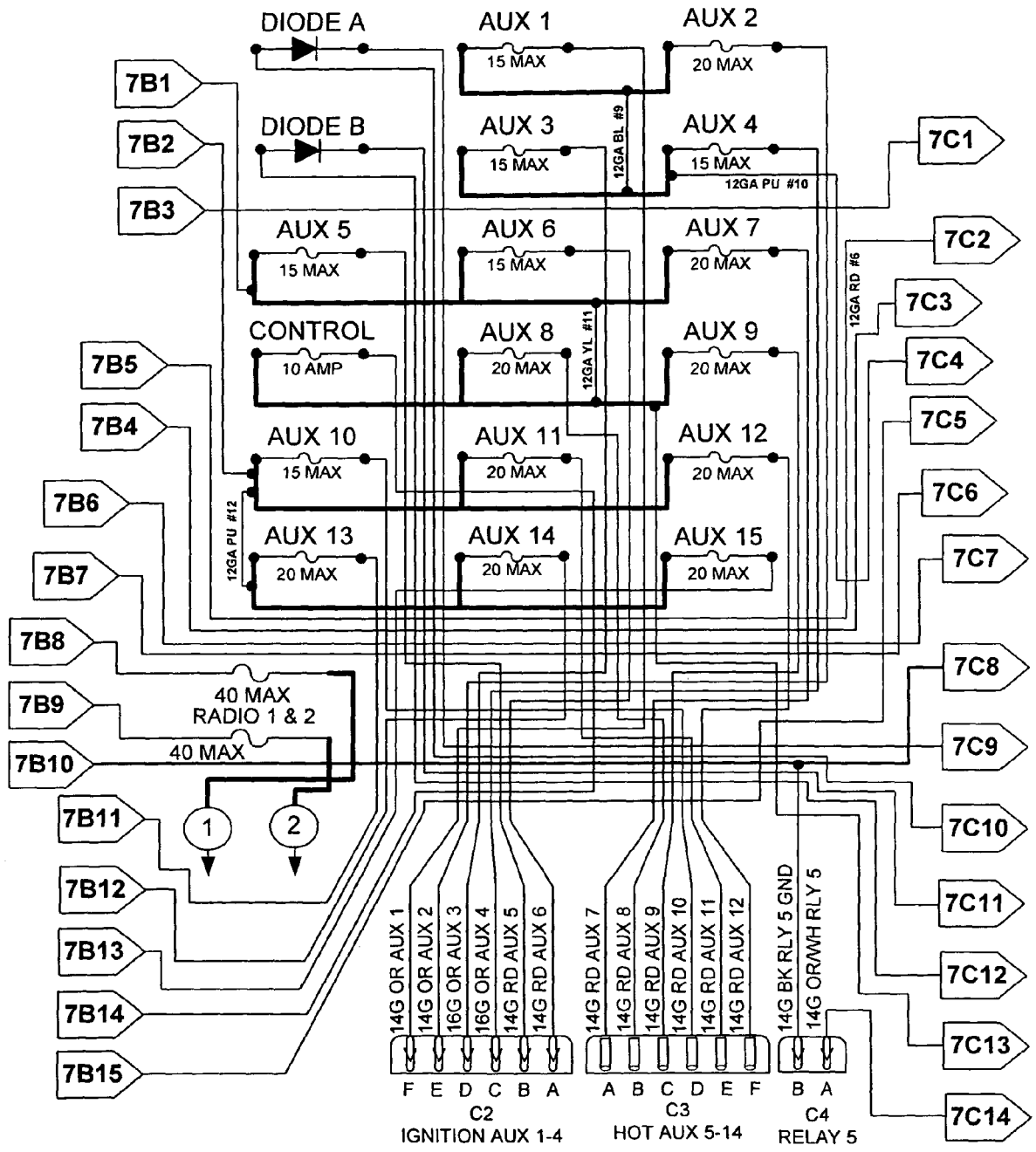
Figure 7C:
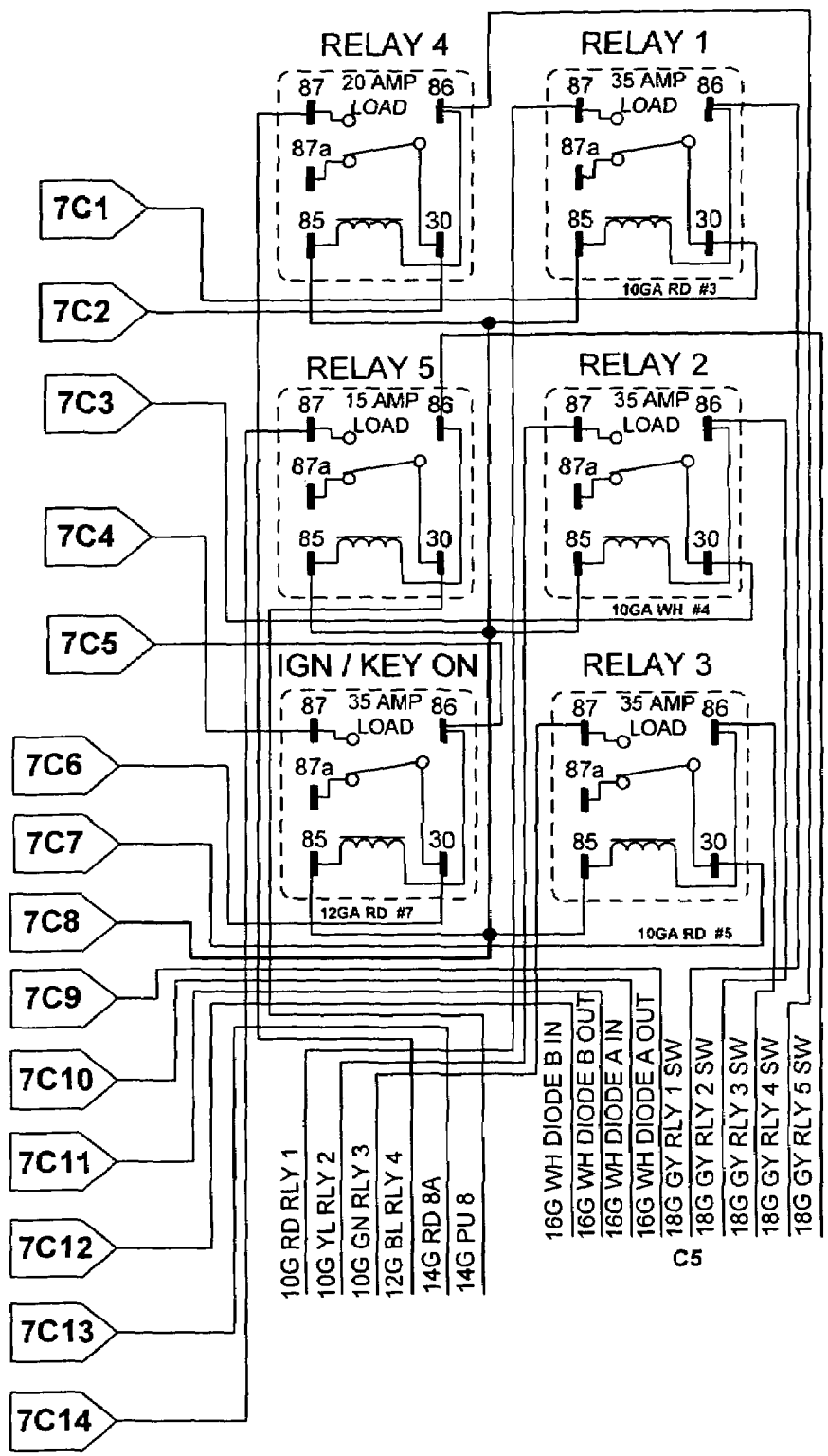

FIGS. 7A, 7B, and 7C illustrate wiring circuitry for either one of the fuse panels 14 or 114. Either one of the fuse panels 14 or 114 has a positive twelve volt buss bar connected directly to the positive terminal of the vehicle battery and a ground buss connected directly to the negative terminal of the battery, or to a vehicle ground on the engine. There is a buss bar connected to a high amperage fuse (e.g., 80 amperes or the like), for protection of high amperage accessories such as high power police radios, which are always hot so that the radios may be operated without turning the ignition switch on. The fuse panel 14 or 114 provides main power fuses for the accessory circuits, which are further divided into a plurality of auxiliary subcircuits which are individually protected by auxiliary fuses. Also mounted on the fuse panel 14 or 114 are five relays which are connected to switches on the console panel, and an ignition relay connected to the ignition switch. Each of the relays is separately protected by a relay fuse connected to the pole of the relay switch. A control fuse is connected between the positive buss bar and one contact of the console switches (described below) in order to protect the solenoid coils in the relays.

In FIG. 7A auxiliary circuits 13-15 are connected to the ignition relay, so that power is applied to these circuits only when the ignition key is turned to the "on" or "ACC" position. Auxiliary circuits 5-15 are always hot, so that power is applied to the accessory devices when the console switch (described below) is turned on to energize the solenoid coils in the relays to close the normally open contacts. The wiring to the connectors is color coded to reflect this difference, the ignition controlled auxiliary circuits 13-15 having orange insulation on the wires and auxiliary circuits 16 having red insulation.

A pair of diodes are also mounted on the fuse panel 14 or 114. The purpose of the diodes is to prevent feedback when accessories are connected to more than one light level control switch on the console panel 18 or 118, as described below.

Figure 8A:
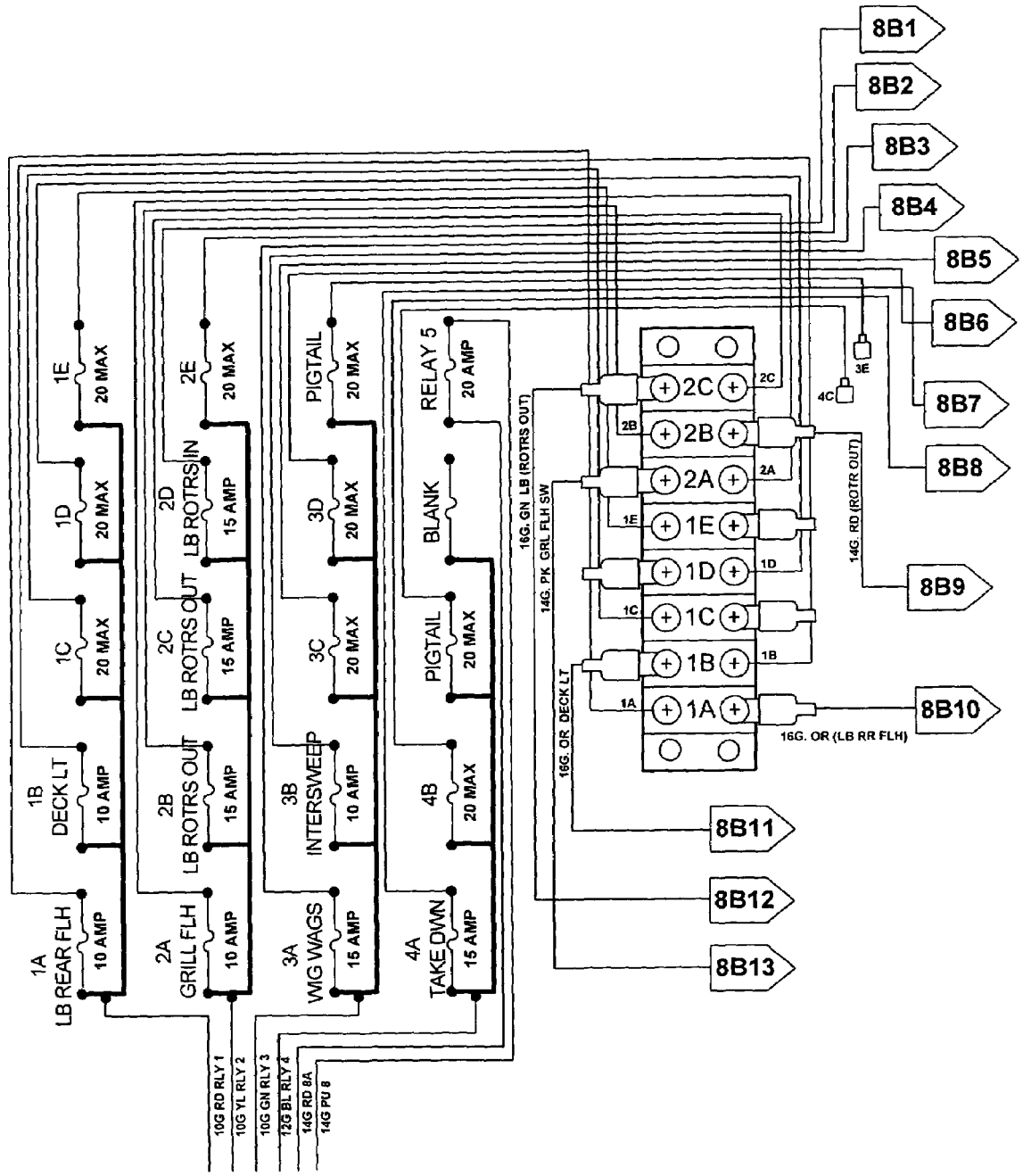
FIGS. 8A and 8B are a schematic drawing of lighting options for a universal fleet electrical system adapted according to the present invention.
Figure 8B:
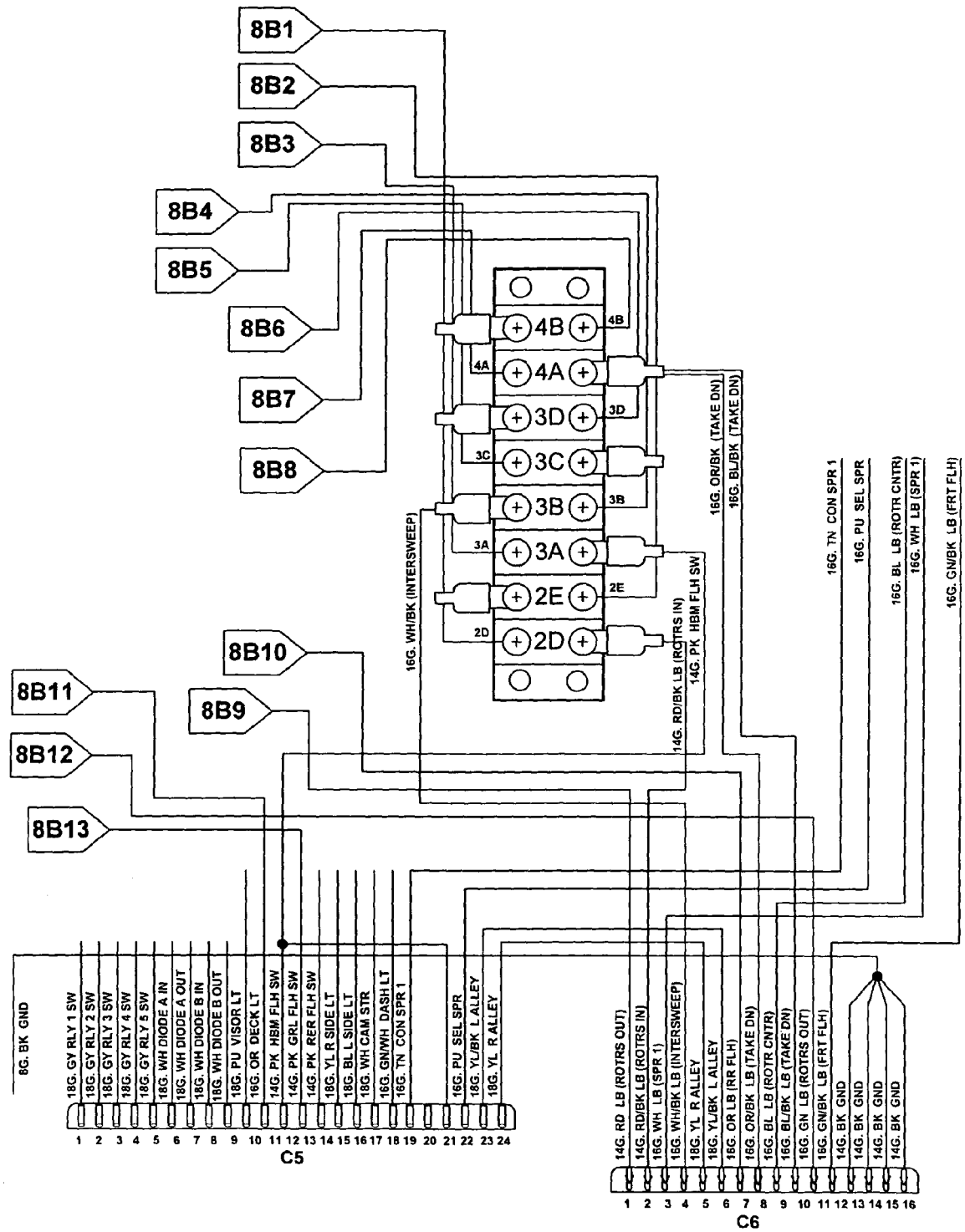

FIGS. 8A and 8B illustrate a schematic diagram of the lighting selector junction box panel. The lighting selector junction box receives power input from four relays via wires, which are color coded red, yellow, green and black, respectively, to distinguish the power input from the different relays. The power input from each relay is further split up into five parallel branches, each branch protected by a fuse and connected to a terminal block. Some of the branches from the relay are left vacant to allow room for future expansion as more accessories are added to the emergency vehicle. Various lighting accessories are connected to the branch circuits by conventional spade terminal push connectors connected to the terminal blocks. This arrangement permits very quick customization of the particular light accessories controlled by each relay, thereby enabling power to a number of accessories to be controlled by a single switch, and permitting multiple light level switches. Wiring to the individual accessory loads is delivered the lighting selection junction box via the connectors. It will be noted that some of the wires delivered to the light selection junction box through the connectors are spare wires from the console panel and light bar connectors, which are therefore available for future expansion as accessories are added to the vehicle. The spare wires are color coded so that their origin and destination may be clearly determined.

It will be noted that various additions may be made to the conventional universal fleet electrical system consistent with the foregoing description. For example, the wiring harness may optionally be expanded to include wiring for a second siren speaker, dash and visor lights, side and mirror lights, a diode harness, a second gun lock, a directional cable and additional forty ampere relay harnesses added to the fuse panel so that five additional relays can be added. Such modifications are obvious and well within the capability of one skilled in the art.

The vehicle battery supplies power to the universal fleet electrical system through the fuse panel. The fuse panel supplies power to the control head or multi-purpose serial controller through the control fuse and ground buss via the color coded wiring harness. The serial controller includes a plurality of switches, which may be push button, slide, rotary, or other switches, and may include both dedicated and programmable switches in which the function of the switch is microprocessor controlled. The serial controller also includes at least one serial port. A serial communications cable connects the serial port to a control unit or one or more serial controlled relays. The color coded wiring of the lighting selector junction box, instead of being connected to individual switches in the console panel, is connected to the control unit or serial controlled relays, so that control of the lighting can be maintained through the lighting selector junction box as described above. Color coded wiring is used to connect the lighting selector junction box or the serial controlled relays to the accessories. Hence, the modified universal fleet electrical system simplifies installation of a serial controller by incorporating the necessary wiring in the wiring harness, while retaining the advantages of the conventional universal fleet wiring system described above.

The universal fleet electrical system may also be configured to provide security power control. For example, the universal fleet electrical system may be configured with a key to enable users to connect and disconnect power to the universal wiring harness. A police officer equipped with such a universal fleet electrical system key may use the key to arm and disarm the system. Unauthorized users will not have access to the radio, emergency lighting, gunlocks, etc. This may be done through a keyed switch mounted on the equipment console. An indicator light may be used to show that the system is armed or ready. Once the key is turned on power is sent to the security power control relay closing the contacts supplying power to the system. A master switch may also be provided with a circuit breaker next to the battery to enable a user to readily disable all interconnected after market equipment. This prevents finger pointing between vehicle operators and vehicle dealerships when there is an electrical problem. Many dealerships do not work on warranty vehicles with emergency equipment.

While the invention has been described with references to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

I claim:

1. A universal fleet electrical system for distributing electrical power to a plurality of aftermarket accessories in a fleet vehicle, comprising:
   (a) a fuse panel adapted for connection to a fleet vehicle's battery, the fuse panel having a plurality of lighting circuit relays, each relay having a solenoid and normally open switch contacts, each relay further having a fuse in series with the relay solenoid;
   (b) a lighting selection junction box electrically connected to said fuse panel, the lighting selection junction box having:
      (i) a plurality of lighting circuits, each lighting circuit being connected to the switch contacts of a separate one of said plurality of lighting relays, each lighting circuit branching into a plurality of lighting subcircuits, each subcircuit having a fuse for circuit protection; and
      (ii) at least one terminal block having a plurality of terminals, each lighting subcircuit being connected to a separate terminal on said terminal block, each terminal having a connector for attachment of a lighting subcircuit accessory wire;
      (iii) wherein a plurality of lighting subcircuit accessories are programmably connected to the switch contacts of a user selected lighting relay by connecting a connector from the subcircuit accessory to a terminal on said terminal block;
   (c) a console panel having a plurality of user operable switches for controlling operation of a plurality of aftermarket accessories added to the fleet vehicle, the console panel being electrically connected to said fuse panel and said lighting selection box, wherein said console panel further comprises:
      (i) at least three lighting level switches, each lighting level switch being connected to a separate one of said lighting relays in order to control application of power to three different combinations of aftermarket lighting accessories by a single switch;
      (ii) a take down switch connected to one of said lighting relays for controlling application of power to aftermarket lighting accessories used when pulling over a motorist; and
      (iii) a spare switch connected to one of said lighting relays for providing a user with a programmable console switch for adding on additional aftermarket accessories; and
   (d) a universal wiring harness electrically connecting said fuse panel, said lighting selection junction box, and said console panel, the wiring harness having a plurality a connectors distributed throughout the fleet vehicle adapted for connection to aftermarket accessories, the connectors being configured as plug and play connectors, the wiring harness having a plurality of color-coded wires stamped with circuit identification labels.

2. The universal fleet electrical system according to claim 1, wherein said fuse panel further comprises:
   (a) a positive voltage buss bar adapted for connection to a positive terminal of the fleet vehicle's battery;
   (b) a ground buss adapted for connection to a negative terminal of the fleet vehicle's battery;
   (c) a pair of main power fuses, each main power fuse branching into a plurality of normally hot auxiliary circuits, each auxiliary circuit having a fuse for protection of the auxiliary circuit, the main power fuses being directly connected to said positive voltage buss bar so that the auxiliary circuits are normally hot, each auxiliary circuit having wires with red insulation and bearing indicia identifying the circuit for quick identification; and
   (d) an ignition relay having a solenoid tapped into the fleet vehicle's ignition switch and having normally open switch contacts connected to a plurality of ignition controlled auxiliary circuits, each ignition controlled auxiliary circuit having an auxiliary fuse and having wires with orange insulation and bearing indicia for rapid circuit identification.

3. The universal fleet electrical system according to claim 1, wherein said fuse panel further comprises a pair of diodes connected in series between said three lighting level switches in order to prevent feedback when at least one accessory is commonly connected to more than one of said lighting level switches and both switches are turned to an "ON" position.

4. The universal fleet electrical system according to claim 1, wherein said console panel further comprises a programmable timer delay connected to said universal wiring harness for turning off circuits a predetermined period of time after the fleet vehicle ignition switch is turned to an "OFF" position.

5. The universal fleet electrical system according to claim 1, wherein said wiring harness includes a modular connector having:
   (a) a through-the-roof base connector; and
   (b) a light bar wiring harness having a weatherproof boot connector attachable to said base connector, the light bar wiring harness being adapted for a light bar accessory mountable on a roof of the fleet vehicle.

6. The universal fleet electrical system according to claim 1, wherein said console panel further comprises a keyed switch interconnected with a security power control relay adapted for connection with a fleet vehicle's battery, the keyed switch and security power control relay enabling a user to connect and disconnect power to the universal wiring harness.

7. The universal fleet electrical system according to claim 1, wherein said universal fleet electrical system further comprises a master switch with a circuit breaker adapted for connection to a fleet vehicle's battery, the master switch and circuit breaker enabling a user to connect and disconnect power to the universal wiring harness.

8. A universal fleet electrical system for distributing electrical power to a plurality of aftermarket accessories in a fleet vehicle, comprising:
   (a) a fuse panel adapted for connection to a fleet vehicle's battery, the fuse panel having a plurality of lighting circuit relays, each relay having a solenoid and normally open switch contacts, each relay further having a fuse in series with the relay solenoid;
   (b) a lighting selection junction box electrically connected to said fuse panel, the lighting selection junction box having:

(i) a plurality of lighting circuits, each lighting circuit being connected to the switch contacts of a separate one of said plurality of lighting relays, each lighting circuit branching into a plurality of lighting subcircuits, each subcircuit having a fuse for circuit protection; and (ii) at least one terminal block having a plurality of terminals, each lighting subcircuit being connected to a separate terminal on said terminal block, each terminal having a connector for attachment of a lighting subcircuit accessory wire;

(iii) wherein a plurality of lighting subcircuit accessories are programmably connected to the switch contacts of a user selected lighting relay by connecting a connector from the subcircuit accessory to a terminal on said terminal block;

(c) a console panel having a plurality of user operable switches for controlling operation of a plurality of aftermarket accessories added to the fleet vehicle, the console panel being electrically connected to said fuse panel and said lighting selection box, the console panel having at least three lighting level switches, each lighting level switch being connectable to different combinations of aftermarket lighting accessories, wherein said console panel further comprises:

(i) at least three lighting level switches, each lighting level switch being connected to a separate one of said lighting relays in order to control application of power to three different combinations of aftermarket lighting accessories by a single switch;

(ii) a take down switch connected to one of said lighting relays for controlling application of power to aftermarket lighting accessories used when pulling over a motorist; and (iii) a spare switch connected to one of said lighting relays for providing a user with a programmable console switch for adding on additional aftermarket accessories; and (d) a universal wiring harness electrically connecting said fuse panel, said lighting selection junction box, and said console panel, the wiring harness having a plurality a connectors distributed throughout the fleet vehicle adapted for connection to aftermarket accessories, the connectors being configured as plug and play connectors.

9. The universal fleet electrical system according to claim 8, wherein said universal wiring harness further comprises a plurality of color-coded wires stamped with circuit identification labels.

10. The universal fleet electrical system according to claim 8, wherein said fuse panel further comprises:

(a) a positive voltage buss bar adapted for connection to a positive terminal of the fleet vehicle's battery;

(b) a ground buss adapted for connection to a negative terminal of the fleet vehicles battery;

(c) a pair of main power fuses, each main power fuse branching into a plurality of normally hot auxiliary circuits, each auxiliary circuit having a fuse for protection of the auxiliary circuit, the main power fuses being directly connected to said positive voltage buss bar so that the auxiliary circuits are normally hot, each auxiliary circuit having wires with red insulation and bearing indicia identifying the circuit for quick identification; and (d) an ignition relay having a solenoid tapped into the fleet vehicle's ignition switch and having normally open switch contacts connected to a plurality of ignition controlled auxiliary circuits, each ignition controlled auxiliary circuit having an auxiliary fuse and having wires with orange insulation and bearing indicia for rapid circuit identification.

11. The universal fleet electrical system according to claim 8, wherein said fuse panel further comprises a pair of diodes connected in series between said three lighting level switches in order to prevent feedback when at least one accessory is commonly connected to more than one of said lighting level switches and both switches are turned to an "ON" position.

12. The universal fleet electrical system according to claim 8, wherein said console panel further comprises a keyed switch interconnected with a security power control relay adapted for connection with a fleet vehicle's battery, the keyed switch and security power control relay enabling a user to connect and disconnect power to the universal wiring harness.

13. The universal fleet electrical system according to claim 8, wherein said universal fleet electrical system further comprises a master switch with a circuit breaker adapted for connection to a fleet vehicle's battery, the master switch and circuit breaker enabling a user to connect and disconnect power to the universal wiring harness.

* * * * *